Patented Oct. 19, 1943

2,332,303

UNITED STATES PATENT OFFICE 2,332,303

CONDENSATION PRODUCT OF AN AMINO-TRIAZOLE, AN ALDEHYDE, AND A HALOGENATED ACYLATED UREA

Gaetano F. D'Alelio, Pittsfield, Mass., assignor to General Electric Company, a corporation of New York No Drawing. Application January 28, 1942, Serial No. 428,586

20 Claims. (Cl. 260—42)

This invention relates to new condensation products and to methods of making the same. The invention is concerned more particularly with self-curing aminoplasts, by which are meant heat-convertible resinous condensation products prepared from amino or amido compounds and having the characteristic property of curing under heat or under heat and pressure to the insoluble, infusible state without the addition of a curing accelerator or catalyst.

This application is a continuation-in-part of my copending applications Serial No. 289,273, filed August 9, 1939, now Patent No. 2,281,559, issued May 5, 1942, and Serial No. 400,649, filed July 1, 1941, now Patent No. 2,294,873, issued September 1, 1942, both of which applications are assigned to the same assignee as the present invention. In application Serial No. 289,273, I disclosed and claimed new and useful compositions of matter comprising a condensation product of ingredients comprising (1) a non-halo-acylated urea, specifically the compound corresponding to the formula $CO(NH_2)_2$, (2) an aliphatic aldehyde, e. g., formaldehyde, and (3) a halogenated acylated urea in which at least one halogen atom is attached to at least one of the following carbon atoms: the alpha carbon atom; the beta carbon atom. In application Serial No. 400,649 I disclosed and claimed compositions comprising a condensation product of ingredients comprising an aminotriazine, an aldehyde and a halogenated acylated urea of the kind above mentioned. I also disclosed in application Serial No. 400,649, which is a continuation-in-part of application Serial No. 289,273, that various aminotriazoles may be used in place of the aminotriazine reactant; also, that the fundamental resins of the invention could be modified with various modifying bodies, including resinous reaction products of aldehydes, for example formaldehyde, with the aminotriazoles (e. g., guanazole, phenyl guanazole, etc.), alone or admixed with, for example, urea, melamine, or urea and melamine. The present invention is directed to new and useful condensation products wherein an aminotriazole (amidogentriazole) is caused to react with an aldehyde in the presence of a halogenated acylated urea of the kind described above and in my aforementioned copending applications.

In the production of aminoplasts it has heretofore been common practice in converting such materials into the insoluble, infusible state to incorporate into the condensation product or into the molding composition a latent or an active (direct) curing catalyst. As pointed out more particularly hereafter, this technique and the final products have not been wholly satisfactory.

I have discovered that self-curing aminoplasts can be produced by condensing an aminotriazole (that is, an aldehyde-reactable aminotriazole), an aldehyde, including polymeric aldehydes, hydroxyaldehydes and aldehyde-addition products, and a halogenated acylated urea of the above-mentioned class. The initial condensation between the components may be carried out at normal or at elevated temperatures, in the presence or absence of a condensation catalyst and under alkaline, neutral or acid conditions.

The halogenated acylated ureas used in practicing this invention are those ureas in which at least one halogen atom is attached to an alpha carbon atom, a beta carbon atom or to both alpha and beta carbon atoms. An example of such a urea is monochloroacetyl urea,

$ClCH_2CONHCONH_2$.

These halogenated acylated ureas are derived from a urea, including thioureas, selenoureas and iminoureas. It is a requisite of these halogenated acylated ureas that they have at least one hydrogen atom attached to a nitrogen atom in the urea grouping. As a result, they are aldehyde-reactable and for purpose of brevity are so termed hereafter and in the appended claims.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in aminoplasts of the admixed-catalyst type. As the value of the molded article, especially light-colored articles, is materially influenced by its appearance, it is clear that the discovery of any means for decreasing or eliminating entirely the production of imperfect articles that must be scrapped or sold at reduced price is of considerable commercial importance.

The resin syrups and molding compositions of this invention may be stored for long periods of time without material alteration. In marked contrast the prior heat-convertible aminoplasts of the aminotriazole-aldehyde type, more particularly those containing direct or active curing catalysts such as acids, for example hydrochloric, ethyl sulphuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the halogenated acylated urea to a partial condensation product of an aminotriazole and an aldehyde and effect further condensation between the components. In producing such a partial condensation product I prefer to cause the condensation reaction between the aminotriazole and the aldehyde to take place in the presence of a primary condensation catalyst and a secondary condensation catalyst. The primary catalyst advantageously is either an aldehyde-non-reactable, nitrogen-containing basic tertiary compound, e. g., tertiary amines such as trialkyl (for example, trimethyl, triethyl, etc.) amines, triaryl (triphenyl, etc.) amines, etc., or an aldehyde-reactable nitrogen-containing basic tertiary compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance a carbonate, cyanide or hydroxide of an alkali metal (e. g., sodium, potassium, lithium, etc.).

Another method of effecting reaction between the ingredients comprises first condensing the halogenated acylated urea with the aldehyde, adding the resulting partial condensation product to an aminotriazole-aldehyde partial condensation product and then causing the reaction to proceed further. Or, I may condense or partially condense the halogenated acylated urea with a mol excess of an aldehyde, add an aminotriazole to this condensation product and effect further reaction between the components. Still other ways may be employed in combining the components and in producing the unmodified and modified condensation products of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified and unmodified resinous masses are self-convertible under heat or under heat and pressure to the insoluble, infusible state.

Depending upon the particular reactants employed and the particular conditions of reaction, the intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. These liquid compositions may be used, for instance, as surface-coating materials, in the production of paints, varnishes, lacquers, enamels, etc., for general adhesive applications, as anti-creasing agents, in producing laminated articles and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration. All parts are by weight.

Example 1

| | Parts |
|---|---|
| 1-phenyl guanazole | 17.5 |
| Aqueous formaldehyde (approx. 37.1% HCHO) | 21.6 |
| Aqueous ammonia (approx. 28% NH$_3$) | 0.5 |
| Aqueous solution of sodium hydroxide (0.5 N) | 1.0 |
| Chloroacetyl urea | 0.3 |

All of the above ingredients with the exception of the chloroacetyl urea were mixed and were allowed to stand at room temperature for several minutes. A milky, white paste formed shortly thereafter indicating that reaction between the components had taken place. The chloroacetyl urea was now added and the resinifying syrup was well stirred. The resulting liquid partial condensation product was then mixed with 10.9 parts alpha cellulose in flock form and 0.1 part of a mold lubricant, specifically zinc stearate, to form a molding composition. The wet molding compound was dried at room temperature until sufficient moisture had been removed to provide a material that could be molded satisfactorily. A sample of the dried and ground molding compound was molded for 5 minutes at 135° C. under a pressure of 6,750 pounds per square inch. The molded piece was extracted hot from the mold and did not become distorted upon cooling to room temperature. The molded article was well cured throughout as evidenced by the fact that when it was immersed in boiling water for 15 minutes, followed by immersion in cold water for 5 minutes, it absorbed only 2.3% by weight of water. It was white and, therefore, could be colored by dyes without any difficulty. It had a smooth, glossy surface appearance and a homogeneous, well-knit structure.

Example 2

| | Parts |
|---|---|
| 1-carbamyl guanazole | 14.2 |
| Aqueous formaldehyde (approx. 37.1% HCHO) | 21.6 |
| Aqueous ammonia (approx. 28% NH$_3$) | 0.5 |
| Aqueous solution of sodium hydroxide (0.5 N) | 1.0 |
| Chloroacetyl urea | 0.3 | were mixed together and were allowed to stand at room temperature for several minutes with stirring. A sample of the partially resinified syrup was heated on a 140° C. hotplate. The resin cured quickly to an insoluble and infusible state. The resinous composition of this example would be particularly suitable for use in the production of molding compounds.

Example 3

The same formula and procedure were employed as described under Example 1 with the exception that 18.9 parts 1-meta-tolyl guanazole were used in place of the 1-phenyl guanazole and a pressure of only 4,500 pounds per square inch instead of 6,750 pounds per square inch was used in producing the molded article. The properties of the resin and of molded articles made from molding compositions containing this resin were much the same as the properties of the corresponding products of Example 1. However, the molded article of this example was somewhat better in water resistance as indicated by the fact that it absorbed only 1.1% by weight of water when tested for its water-resistance characteristics as described under Example 1.

Example 4

| | Parts |
|---|---|
| 1-phenyl guanazole | 17.5 |
| Urea | 6.0 |
| Aqueous formaldehyde (approx. 37.1% HCHO) | 35.0 |
| Aqueous ammonia (approx. 28% NH$_3$) | 0.9 |
| Aqueous solution of sodium hydroxide (0.5 N) | 1.6 |
| Chloroacetyl urea | 0.4 |

All of the above ingredients with the exception of the 1-phenyl guanazole were heated together under reflux at the boiling temperature of the mass for 15 minutes. The guanazole derivative was now added to the urea-chloroacetyl urea-formaldehyde partial condensation product and the resulting mixture was mixed with 20.7 parts alpha cellulose in flock form and 0.1 part zinc stearate to form a molding compound. The wet molding composition was dried at room temperature as described in Example 1. A sample of the dried and ground molding compound was molded for 5 minutes at 135° C. under a pressure of 5,000 pounds per square inch. A well-cured, white molded article having a well-knit and homogeneous structure was obtained. It absorbed only 3.4% by weight of water when tested for its water-resistance characteristics as described under Example 1.

Example 5

| | Parts |
|---|---|
| 1-phenyl guanazole | 17.5 |
| Dimethylol urea (commercial grade containing approx. 11% by weight of water) | 12.0 |
| Aqueous formaldehyde (approx. 37.1% HCHO) | 21.6 |
| Aqueous ammonia (approx. 28% NH$_3$) | 0.9 |
| Aqueous solution of sodium hydroxide (0.5 N) | 1.6 |
| Water | 15.0 |
| Chloroacetyl urea | 0.2 |

All of the above ingredients with the exception of the 1-phenyl guanazole were heated together at boiling temperature under reflux for 15 minutes. The resulting resinous condensation product was cooled. The 1-phenyl guanazole was added to the cooled mass and the reaction mixture then was allowed to stand for several minutes to insure intercondensation of the guanazole with the other components of the reaction mass. A molding compound was made from the partially resinified syrup by mixing therewith 22.7 parts of alpha cellulose and 0.1 part zinc stearate. The wet molding compound was dried at room temperature as described under Example 1. A sample of the dried and ground molding compound was molded into the form of a disk, using a molding time of 5 minutes, a molding temperature of 135° C. and a molding pressure of 6,750 pounds per square inch. The molded disk was well cured throughout and had a homogeneous and well-knit structure. It was white in color and had good water resistance as shown by the fact that it absorbed only 2.2% by weight of water when tested for its water-resistance characteristics as described under Example 1.

Example 6

| | Parts |
|---|---|
| 1-phenyl guanazole | 17.5 |
| Melamine | 12.6 |
| Aqueous formaldehyde (approx. 37.1% HCHO) | 49.6 |
| Aqueous ammonia (approx. 28% NH$_3$) | 1.1 |
| Aqueous solution of sodium hydroxide (0.5 N) | 1.4 |
| Chloroacetyl urea | 0.3 |

All of the above ingredients with the exception of the 1-phenyl guanazole and the chloroacetyl urea were heated together under reflux at boiling temperature for 15 minutes. After cooling the reaction mass the 1-phenyl guanazole was added thereto. The reaction mixture was allowed to stand for several minutes to allow the guanazole to intercondense with the melamine-formaldehyde partial condensation product. The resulting resinous material was mixed with 28.1 parts alpha cellulose, 0.1 part zinc stearate and the above-stated amount of chloroacetyl urea. The wet molding compound thereby produced was dried at room temperature as described under Example 1. A sample of the dried and ground molding compound was molded for 8 minutes at 135° C. under a pressure of 6,750 pounds per square inch. The molded piece was white in color, had a well-knit and homogeneous structure and was well cured throughout. It had excellent resistance to water as shown by the fact that it absorbed only 0.45% by weight of water when tested for its water-resistance characteristics as described under Example 1. The molding compound showed good plasticity during molding.

*Example 7*

A

| | Parts |
|---|---|
| Trimethylol melamine (crystalline) | 21.6 |
| Aqueous ammonia (approx. 28% NH₃) | 0.6 |
| Aqueous solution of sodium hydroxide (0.5 N) | 0.4 |
| Water | 25.0 | were heated together under reflux at the boiling temperature of the mass for 13 minutes, after which the mass was cooled to room temperature.

B

| | Parts |
|---|---|
| 1-phenyl guanazole | 17.5 |
| Aqueous formaldehyde (approx. 37.1% HCHO) | 21.6 |
| Aqueous ammonia (approx. 28% NH₃) | 0.5 |
| Aqueous solution of sodium hydroxide (0.5 N) | 1.0 | were mixed together and then were allowed to react at room temperature. The products of A and B were mixed together and, at the same time, 0.3 part chloroacetyl urea was added thereto. The reaction mixture was stirred for several minutes to permit the components to intercondense. The viscous resinous syrup produced in this manner was mixed with 21.3 parts alpha cellulose and 0.1 part zinc stearate. The resulting wet molding compound was dried at room temperature as described under Example 1. A white, well-cured molded piece having a well-knit and homogeneous structure was produced by molding a sample of the dried and ground compound for 5 minutes at 135° C. under a pressure of 6,750 pounds per square inch. The cured piece had excellent resistance to water, absorbing only 0.4% by weight of water when tested for its water-resistance characteristics as described under Example 1. The plasticity of the molding compound during molding was very good.

*Example 8*

| | Parts |
|---|---|
| 1-phenyl guanazole | 17.5 |
| Thiourea | 7.6 |
| Aqueous formaldehyde (approx. 37.1% HCHO) | 37.8 |
| Aqueous formaldehyde (approx. 28NH₃) | 1.5 |
| Aqueous solution of sodium hydroxide (0.5 N) | 1.4 |
| Chloroacetyl urea | 0.3 |

All of the above components with the exception of the 1-phenyl guanazole and the chloroacetyl urea were heated together under reflux at boiling temperature for 5 minutes. The chloroacetyl urea was now added and refluxing was continued for an additional 5 minutes. The 1-phenyl guanazole was added to the resulting reaction mass and immediately thereafter the hot mixture was mixed with 21.9 parts alpha cellulose and 0.1 part zinc stearate to form a molding compound. The wet molding composition was dried at room temperature as described under Example 1. A sample of the dried and ground molding compound was molded for 5 minutes at 135° C. under a pressure of 6,750 pounds per square inch. A white, well-cured, well-knit and homogeneous molded piece was obtained. It absorbed only 1.7% by weight of water when tested for its water-absorption value as described under Example 1. The molding composition showed good plastic flow during molding.

*Example 9*

| | Parts |
|---|---|
| 1-phenyl guanazole | 17.5 |
| 4,6-diamino pyrimidyl-2 ortho-hydroxyphenyl carbamyl-methyl sulfide | 29.0 |
| Aqueous formaldehyde (approx. 37.1% HCHO) | 70.2 |
| Aqueous ammonia (approx. 28% NH₃) | 2.0 |
| Aqueous solution of sodium hydroxide (0.5 N) | 2.0 |
| Water | 40.0 |
| Chloroacetyl urea | 0.3 |

All of the above components with the exception of the chloroacetyl urea and the 1-phenyl guanazole were heated together under reflux at boiling temperature for about 1 minute. The 1-phenyl guanazole and chloroacetyl urea were now added to the hot resinous partial condensation product. The resulting resinous composition was mixed with 40.3 parts alpha cellulose and 0.2 part zinc stearate to form a molding compound. The wet composition was dried at room temperature as described under Example 1. A sample of the dried and ground molding compound was molded for 5 minutes at 135° C. under a pressure of 6,750 pounds per square inch. The molded piece was extracted hot from the mold and did not become distorted upon cooling to room temperature. It was well cured throughout, was yellow in color and had a well-knit and homogeneous structure. It absorbed only 2.9% by weight of water when tested for its water-resistance characteristics as described under Example 1. The molding compound showed very good flow characteristics during molding.

*Example 10*

A liquid phenol-formaldehyde partial condensation product was prepared by heating together the following components for 4½ hours at an average temperature of 65° C.:

| | Parts |
|---|---|
| Phenol (95% phenol, 5% water) | 94.7 |
| Aqueous formaldehyde (approx. 37.1% HCHO) | 195.0 |
| Sodium carbonate | 2.19 |

The resin produced in this manner is described in the following formulation as "phenolic resin syrup":

| | Parts |
|---|---|
| Phenolic resin syrup | 28.7 |
| 1-phenyl guanazole | 17.5 |
| Aqueous formaldehyde (approx. 37.1% HCHO) | 21.6 |
| Chloroacetyl urea | 1.0 |

All of the above components with the exception of the chloroacetyl urea were heated together under reflux at boiling temperature for 3 minutes. The chloroacetyl urea was now added and the resulting mixture was allowed to stand for several minutes so as to insure intercondensation of the chloroacetyl urea with the other components of the mass. The resinous syrup produced in this manner was mixed with 16.5 parts alpha cellulose and 0.1 part zinc stearate to form a molding compound. The wet compound was dried at room temperature as described under Example 1. A sample of the dried and ground molding compound was molded for 15 minutes at 135° C. under a pressure of 9,000 pounds per square inch. The molded piece was yellow in color and had a well-knit structure. It was well cured throughout as shown by the fact that it absorbed only 2.8% by weight of water when tested for its water-absorption value as described under Example 1. The molding compound showed good plastic flow during molding.

*Example 11*

| | Parts |
|---|---|
| 1-carbamyl guanazole | 14.2 |
| 4,6-diamino pyrimidyl-2 ortho-hydroxyphenyl-carbamyl-methyl sulfide | 29.0 |
| Aqueous formaldehyde (approx. 28% NH$_3$) | 70.2 |
| Aqueous ammonia (approx. 28% NH$_3$) | 2.0 |
| Aqueous solution of sodium hydroxide (0.5 N) | 2.0 |
| Water | 40.0 |
| Chloroacetyl urea | 0.3 |

The same procedure was followed in effecting reaction between the above components and in producing a molding composition and a molded article therefrom as described in Example 9, with the exception that a molding time of 7 minutes was used in molding the molding compound. The molded article was yellow in color and had a low water-absorption value, absorbing only 1.8% by weight of water when tested as described under Example 1. The molded piece was well cured throughout and had a well-knit structure.

*Example 12*

The same formula and procedure were followed as described under Example 10 with the exception that 14.2 parts of 1-carbamyl guanazole were used in place of 17.5 parts of 1-phenyl guanazole and a molding time of 5 minutes and a molding pressure of 5,000 pounds per square inch were used instead of the time and pressure periods specified in Example 10. The molded piece was dull white in color and absorbed only 1.8% by weight of water when tested for its water-resistance characteristics as described under Example 1. It was well cured throughout and had a well-knit and homogeneous structure.

*Example 13*

| | Parts |
|---|---|
| 1-carbamyl guanazole | 14.2 |
| Thiourea | 7.6 |
| Aqueous formaldehyde (approx. 37.1% HCHN) | 37.8 |
| Aqueous ammonia (approx. 28% NH$_3$) | 1.5 |
| Aqueous solution of sodium hydroxide (0.5 N) | 1.4 |
| Chloroacetyl urea | 0.3 |

All of the above ingredients with the exception of the 1-carbamyl guanazole and the chloroacetyl urea were heated together under reflux at boiling temperature for 5 minutes. The 1-carbamyl guanazole was now added and refluxing was continued for an additional 5 minutes. The chloroacetyl urea was added to the clear resinous syrup produced in this manner. The resulting liquid partial condensation product was mixed with 21.9 parts alpha cellulose and 0.1 part zinc stearate to form a molding compound. The wet molding composition was dried at room temperature as described under Example 1. A sample of the dried and ground molding compound was molded for 5 minutes at 135° C. under a pressure of 4,000 pounds per square inch. The molded piece was removed hot from the mold and did not warp upon cooling to room temperature. It was yellow in color and had a well-knit and homogeneous structure. It was well cured throughout and absorbed only 1.4% by weight of water when tested for its water-absorption value as described under Example 1.

The following examples illustrate the nature of the resin and of molding compositions made therefrom that are obtained when a halogenated acylated urea of the kind with which this invention is concerned is not incorporated into the aminotriazole-aldehyde condensation product.

*Example 14*

| | Parts |
|---|---|
| 1-meta-tolyl guanazole | 14.3 |
| Aqueous formaldehyde (approx. 37.1% HCHO) | 18.1 |
| Aqueous solution of sodium hydroxide 0.46 N) | 0.8 | were heated together in an open reaction vessel for 1 minute, at the end of which period of time a resinous layer began to form. The partially resinified material was mixed with 10.5 parts alpha cellulose and 0.02 part zinc stearate to form a molding composition. The wet molding compound was dried at room temperature as described under Example 1. A sample of the dried and ground molding composition was molded into the form of a disk, using a molding time of 5 minutes, a molding pressure of 3,500 pounds per square inch and a molding temperature of 135° C. The molded piece was not completely cured to an insoluble and infusible state, as shown by the fact that it had very poor water resistance when tested as described under Example 1.

*Example 15*

| | Parts |
|---|---|
| 1-phenyl guanazole | 13.1 |
| Aqueous formaldehyde (approx. 37.1% HCHO) | 18.1 |
| Aqueous solution of sodium hydroxide (0.46 N) | 0.8 | were heated together for 1 minute, resulting in the formation of two distinct layers. The resinous layer was mixed with 10.3 parts alpha cellulose and 0.02 part zinc stearate to form a molding composition. The wet compound was dried at 60° C. until sufficient moisture had been removed to provide a material that could be molded satisfactorily. A sample of the dried and ground molding composition was molded at a temperature of 135° C. for 3 minutes under a pressure of 4,500 pounds per square inch. The molded piece absorbed 24% by weight of water when tested as described under Example 1. This shows that the molded article was not completely cured to an insoluble and infusible state.

It will be understood, of course, by those skilled in the art that the reaction between the reactants may be effected at temperatures ranging, for example, from room temperature to the fusion or boiling temperatures of the mixed reactants, the reaction proceeding more slowly at normal temperatures than at elevated temperatures in accordance with the general law of chemical reactions. Thus, instead of effecting reaction between the various ingredients of Examples 4 to 13, inclusive, at boiling temperature under reflux as stated in the individual examples, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood that the aldehyde-reactable halogenated acylated urea mentioned in the above examples is only by way of illustration and that various other aldehyde-reactable halogenated acylated ureas may be used in carrying this invention into effect. Additional examples of such halogenated ureas are:

N-methyl, N'-(chloroacetyl) urea
N-phenyl, N'-(trichloroacetyl) thiourea
N-methyl, N-(alpha bromopropionyl) urea
N-methyl, N'-phenyl, N'-(beta iodopropionyl) urea
N-(para-chlorobenzyl), N'-(alpha, beta dichloropropionyl) urea
N-naphthyl, N'-(alpha chloro, beta bromopropionyl) urea
N-(beta chloroethyl), N-(alpha iodo, beta chloropropionyl) urea
N-(alpha bromoacetyl), N'-(alpha chlorobutyryl) urea
N-(beta chlorobutyryl)-ethyl-allophanate
Alpha dibromopropionyl guanidine
Alpha bromophenylacetyl biuret
N-cyano, N'-(alpha, beta dibromo hydrocinnamyl) urea
Dichloroacetyl urea
Trichloroacetyl urea
Monobromoacetyl urea
Dibromoacetyl urea
Tribromoacetyl urea
Sym. di-(monobromoacetyl) urea
Sym. di-(dibromoacetyl) urea
Sym. di-(tribromoacetyl) urea
Sym. di-(chloroacetyl) urea
Sym. di-(dichloroacetyl) urea
Sym. di-(trichloroacetyl) urea
N-(bromoacetyl), N'-(chloroacetyl) urea Formulas for the above examples of halogenated acylated ureas are given in my copending application Serial No. 289,273.

It also will be understood by those skilled in the art that in each of the specific halogenated acylated ureas above mentioned the particular halogen shown in any specific formula may be replaced by some other halogen, care being taken in the choice of the halogen in the light of the properties desired in the final products. For example when light-covered molded articles are desired, the use of iodo derivatives should be avoided and when the heat-convertible resins are to be used in the production of molding compositions, the fluoro derivatives preferably are avoided.

Where a plurality of halogen atoms are present in the halogenated acylated urea, these may be the same or different. For example, one halogen in the molecule may be chlorine and another, bromine. In this way it is possible to obtain a heat-convertible resin of self-curing characteristics and other properties best adapted to meet a particular molding problem and service application of the finished article.

Likewise, it also will be understood that the aminotriazoles named in the above examples are by way of illustration and that any other aldehyde-reactable aminotriazole may be employed. I prefer to use triazoles containing either at least one unsubstituted amidogen (-NH₂) group or a plurality of partly substituted amidogen groups. Examples of such triazoles which may be used in producing the new synthetic materials of this invention are guanazole, 3-hydrazino 1,2,4-triazole, 3-amino 1,2,4-triazole, 1-phenyl 5-amino 1,2,3-triazole, 5-amino 3-oxy 1,2,4-triazole, 1-amino 1,2,3-triazole; derivatives of guanazole, e. g., 3,5-dihydrazino 1,2,4-triazole, guanazo-guanazole, imidurazo-guanazole, 4-phenyl 3,5-dianilino 1,2,4-triazole, etc.; nuclearly substituted aminotriazoles, e. g., 4-p-tolyl 3,5-di-p-toluidino 1,2,4-triazole, 1,4-diphenyl 3,5-dianilino 1,2,4-triazole, 2-methyl 1-phenyl guanazole, 1-phenyl 3-amino 5-methyl 1,2,4-triazole, 2-phenyl 5-amino 4-methyl 1,2,3-triazole, 1-phenyl guanazole, the 1-tolyl guanazoles, the 1-naphthyl guanazoles, 1-phenyl 3-amino 1,2,4-triazole, 3,4-diamino 1,2,4-triazole, 2-phenyl 4,5-diamino 1,2,3-triazole; poly-amino triazoles wherein the hydrogen atoms of one or all of the amino groups are partially substituted by other amino groups, e. g., 3,5-dihydrazino 4-amino 1,2,4-triazole, 3-hydrazino 5-amino 1,2,4-triazole, 4-hydrazino 5-amino 1,2,3-triazole, etc.; poly-amino triazoles wherein the hydrogen atoms of one or all of the amino groups are partially substituted by other monovalent substituents (e. g., alkyl, aryl, aralkyl, alkaryl, etc.), for instance 1-phenyl 5-amino 3-anilino 1,2,4-triazole; 1-phenyl 5-amino 3-p-toluidino 1,2,4-triazole, 4-β-naphthyl 3,5-di-(β-naphthylamino) 1,2,4-triazole, 2-phenyl 4-amino 5-acetamino 1,2,3-triazole.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, benzaldehyde, hydroxy-aldehydes (e. g., glycollic aldehyde, glyceraldehyde), furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-methylol derivatives of urea, thiourea, selenourea and iminourea, and of substituted ureas, thioureas, selenoureas and iminoureas (numerous examples of which are given in my copending application Serial No. 377,524, filed February 5, 1941, and assigned to the same assignee as the present invention), mono- and poly-(N-carbinol) derivatives of amides of polycarboxylic acids, e. g., maleic, itaconic, fumaric, adipic, malonic, succinic, citric, phthalic, etc., mono- and poly-(N-carbonol) derivatives of amidogentriazines, numerous examples of which are given in my copending application Serial No. 377,524. Particularly good results are obtained with active methylene-containing bodies such as mono- and di-methylol ureas and the methylol melamines, e. g., mono-, di-, tri-, tetra-, penta-and hexa-methylol melamines. Mono- or poly-(N-carbinol) derivatives, specifically the mono- or poly-methylol derivatives, of an aminotriazole as, for instance, a methylol guanazole may be caused to react with the halogenated acylated ureas used in carrying the present invention into effect, in which case it is not necessary to use an aminotriazole and an aldehyde as individual starting reactants. Mixtures of aldehydes and aldehyde-addition products may be employed, for example mixtures of formaldehyde and methylol compounds such, for instance, as dimenthylol urea, dimethylol guanazole and trimethylol melamine.

A part of the aminotriazole reactant may be replaced if desired by, for example, a urea, e. g., urea ($NH_2CONH_2$), thiourea, selenourea, iminourea and aldehyde-reactable substitution products thereof, e. g., methyl urea, phenyl thiourea, etc., by aldehyde-addition products of a urea, e. g., dimethylol urea, etc., or by other organic compounds capable of reacting with an aldehyde, especially compounds which react with aldehydes to form resins. Numerous examples of compounds embraced by the term "a urea" are given in my copending application Serial No. 289,273. I may use either a single or a plurality of halogenated acylated ureas with the aminotriazole reactant or with the aminotriazole and urea reactants. Various aminodiazines, aminodiazoles or aminotriazines may be used in place of a part of the aminotriazole.

The ratio of the aldehydic reactant to the aminotriazole may be considerably varied but, in general, it is desirable to use at least one mol of an aldehyde for each mol of aminotriazole. In producing the heat-convertible resinous condensation products of this invention, the proportion of the halogenated acylated urea in all cases is at least sufficient to render the resin convertible under heat to an insoluble, infusible state. Ordinarily not exceeding substantially ⅛ mol of halogenated acylated urea is used for each mol of aminotriazole. No advantage accrues from using an amount of halogenated acylated urea above the minimum required to secure the desired curing rate. Further, the use of higher amounts of halogenated acylated urea is undesirable for most molding applications because of the greater difficulty in obtaining molded articles of suitable hardness, but may not be objectionable for other applications of the material. Also, in some cases, particularly where high molecular weight halogenated acylated ureas, as for example N-(alpha chlorostearyl) urea, are used, the halogenated acylated urea part of the resin molecule exceeds on a weight basis the aminotriazole portion of the molecule. Consequently, in such cases, the inherent characteristics (for example, waxy nature) of the halogenated acylated urea predominate in the resin molecule. This may be objectionable in some applications of the molded part, for instance where resistance to the ordinary organic solvents is required.

From the foregoing it will be seen that the particular mol ratio of halogenated acylated urea to the other components is dependent somewhat upon the inherent characteristics and other properties desired in the heat-curable and heat-cured resinous condensation products.

The aldehydic reactant may be used, for example, in an amount corresponding to from one to six or seven mols thereof for each mol of aminotriazole. Good results usually are obtained by using from 1½ to 3¼ mols of aldehyde, specifically formaldehyde, for each mol of aminotriazole. Taking 1-amino guanazole (an aminotriazole containing three unsubstituted amidogen groups) as illustrative of the aminotriazole, particularly good results are obtained with approximately three mols aldehyde, e. g., formaldehyde, or slightly in excess of three mols aldehyde, for each mol of 1-amino guanazole. If the aminotriazole contains only two unsubstituted amidogen groups (or one unsubstituted and two partly substituted amidogen groups), then one advantageously may use approximately two mols aldehyde, or slightly in excess of two mols aldehyde, for each mol of aminotriazole. If the aminotriazole contains only one unsubstituted amidogen group (or two partly substituted amidogen groups), then no particular advantage usually accrues from using much in excess of one mol aldehyde for each mol of such an aminotriazole. When the aldehyde is available for reaction in the form of an aldehyde-addition product such, for instance, as dimethylol urea, trimethylol melamine, etc., then higher amounts of such aldehyde-addition products ordinarily are used, for example from two or three to twelve or fifteen or more mols of such aldehyde-addition product for each mol of the aminotriazole.

When an aldehyde-addition product of an aminotriazole, e. g., a methylol guanazole as for instance dimethylol guanazole, is used as a reactant with a halogenated acylated urea of the kind with which this invention is concerned, such aldehyde-addition product functions in a dual capacity in that it provides a source for the introduction of both an aminotriazole and an alkylene bridge, e. g., —$CH_2$—, into the resin molecule. The aldehyde-addition product may be used alone or together with an aminotriazole, or with an aldehyde or with both an aldehyde and an aminotriazole.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, isobutyl, hexyl, etc., alcohols; polyhydric alcohols such as ethylene glycol, diethylene glycol, glycerine, pentaerythritol, polyvinyl alcohol, etc.; amides such as formamide, acetamide, stearamide, acrylamide, benzamide, toluene sulfonamides, benzene sulfonamides, adipic diamide, phthalamide, etc.; amines, e. g., ethylene diamine, aniline, phenylene diamine, etc.; phenol and substituted phenols, e. g., the aminophenols, the cresols, the xylenols, the tertiary alkyl phenols and other phenols such as mentioned in my Patent 2,239,441; ketones; nitriles, e. g., acrylonitrile, methacrylonitrile, succinonitrile, etc.; and others. Those modifying agents which are reactable with the aminotriazole, or with the aldehyde or with the reaction product of the aldehyde and the aminotriazole (that is, an aldehyde-addition product of the aminotriazole, e. g., dimethylol guanazole) may be incorporated into the composition by mixing all the reactants and effecting condensation therebetween or by various permutations of reactants as described, for example, in my Patent 2,239,441 with particular reference to reactions involving a phenol, an aliphatic aldehyde and a malonic compound (page 3, column 1, lines 2-24).

The modifying bodies also may take the form of high molecular weight bodies with or without resinous characteristics, for example hydrolyzed wood products, formalized cellulose derivatives, lignin, protein-aldehyde condensation products, resinous reaction products of aldehydes, for example formaldehyde, with the aminotriazines (e. g., melamine, ammeline, etc.), alone or admixed with, for example, urea, guanazole, or urea and guanazole, resins obtained by reaction of an aldehyde with the aminodiazines (e. g., 2, 4, 6-triaminopyrimidine, 2, 4-diaminoquinazoline, etc.) or with the aminodiazoles, alone or admixed with, for example, urea, melamine or urea and melamine. Other examples of modifying bodies are the urea-aldehyde condensation product, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide molding compositions best fitted to yield molded articles of optimum properties for the particular service application.

From the foregoing description it will be seen that the present invention provides new and useful compositions of matter comprising a condensation product (in heat-curable or heat-cured state) of ingredients comprising essentially (1) an aminotriazole (amidogentriazole), e. g., guanazole, (2) an aldehyde, e. g., formaldehyde, and (3) an aldehyde-reactable halogenated acylated urea in which at least one halogen atom is attached to at least one of the following carbon atoms: the alpha carbon atom; the beta carbon atom. The scope of the invention also includes method features for the production of such condensation products. For instance, one method feature of the invention comprises effecting partial reaction between ingredients comprising an aminotriazole, specifically a guanazole, an aldehyde, e. g., formaldehyde (or ingredients comprising a urea, specifically $NH_2CONH_2$, an aminotriazole and an aldehyde) in the presence of an alkaline condensation catalyst, specifically a condensation catalyst comprising ammonia and a fixed alkali, adding a small amount of one or more of the herein described halogenated acylates ureas (e. g., a haloacetyl urea such as mono-, di- or tri-chloroacetyl ureas or mixtures thereof, mono-, di- or tri-bromoacetyl ureas or mixtures thereof, etc.) to the resulting partial condensation product and causing the halogenated acylated urea to intercondense with the said partial condensation product. My invention also provides thermosetting (heat-hardenable) molding compositions comprising a filler, e. g., a cellulosic filler, and a heat-curable condensation product of this invention, e. g., a heat-hardenable (heat-curable) condensation product of ingredients comprising a guanazole (or urea and a guanazole), formaldehyde or its equivalent, and an alpha-halogenated, a beta-halogenated or an alpha- and beta-halogenated acylated urea, as well as molded articles of manufacture comprising the heat-set molding compositions.

The modified and unmodified resinous compositions of this invention have a wide variety of uses. For example, in addition to their use in the production of molding compositions, they may be employed as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the condensation product of ingredients comprising an aminotriazole, an aldehyde and an aldehyde-reactable halogenated acylated urea in which at least one halogen atom is attached to at least one of the following carbon atoms: the alpha carbon atom; the beta carbon atom.

2. A composition as in claim 1 wherein the condensation product is an alcohol-modified condensation product of the stated components.

3. A composition as in claim 1 wherein the aminotriazole is a guanazole.

4. A heat-curable resinous condensation product of ingredients comprising an aminotriazole, formaldehyde and an aldehyde-reactable halogenated acylated urea in which at least one halogen atom is attached to at least one of the following carbon atoms: the alpha carbon atom; the beta carbon atom.

5. A product comprising the cured resinous condensation product of claim 4.

6. A composition comprising the product of reaction of (1) a partial condensation product of ingredients comprising an aminotriazole and an aldehyde, and (2) an aldehyde-reactable halogenated acylated urea in which at least one halogen atom is attached to at least one of the following carbon atoms: the alpha carbon atom; the beta carbon atom.

7. A resinous composition comprising the product of reaction (1) a partial condensation product obtained by reaction, while admixed with an alkaline substance, of ingredients comprising a guanazole and formaldehyde, and (2) an aldehyde-reactable halogenated acylated urea in which at least one halogen atom is attached to at least one of the following carbon atoms: the alpha carbon atom; the beta carbon atom.

8. A resinous composition comprising the product of reaction of (1) a partial condensation product obtained by reaction, while admixed with a condensation catalyst comprising ammonia and a fixed alkali, of ingredients comprising a guanazole and formaldehyde, and (2) a haloacetyl urea.

9. A resinous composition obtained by reaction of ingredients comprising 1-phenyl guanazole, formaldehyde and a chloracetyl urea.

10. A resinous composition comprising the product of reaction of ingredients comprising urea, 1-phenyl guanazole, formaldehyde and monochloroacetyl urea.

11. A composition comprising the product of reaction of ingredients comprising a methylol guanazole and an aldehyde-reactable halogenated acylated urea in which at least one halogen atom is attached to at least one of the following carbon atoms: the alpha carbon atom; the beta carbon atom.

12. A composition comprising the resinous product of reaction of a plurality of reactants including an aminotriazole, dimethylol urea and an aldehyde-reactable halogenated acylated urea in which at least one halogen atom is attached to at least one of the following carbon atoms: the alpha carbon atom; the beta carbon atom.

13. A resinous composition comprising the product of reaction of ingredients comprising a guanazole, dimethylol urea and a chloracetyl urea.

14. A heat-curable resinous condensation product of ingredients comprising urea, 1-phenyl guanazole, formaldehyde and an aldehyde-reactable halogenated acylated urea in which at least one halogen atom is attached to at least one of the following carbon atoms: the alpha carbon atom; the beta carbon atom.

15. A product comprising the cured resinous condensation product of claim 14.

16. A thermosetting molding composition comprising a filler and a heat-hardenable resinous condensation product of ingredients comprising an aminotriazole, formaldehyde and a chloroacetyl urea.

17. An article of manufacture comprising the heat-set molding composition of claim 16.

18. The method of preparing new condensation products which comprises effecting reaction between ingredients comprising an aminotriazole, an aldehyde and an aldehyde-reactable halogenated acylated urea in which at least one halogen atom is attached to at least one of the following carbon atoms: the alpha carbon atom; the beta carbon atom.

19. The method which comprises effecting partial reaction between ingredients comprising a guanazole, urea and formaldehyde in the presence of a condensation catalyst comprising ammonia and a fixed alkali, adding a small amount of a chloroacetyl urea to the resulting partial condensation product, and causing the chloracetyl urea to intercondense with the said partial condensation product.

20. A method as in claim 19 wherein the guanazole is 1-phenyl guanazole.

GAETANO F. D'ALELIO.

CERTIFICATE OF CORRECTION.

Patent No. 2,332,303. October 19, 1943.

GAETANO F. D'ALELIO.

It is hereby certified that error appears in the printed specification of the above numbered patent requiring correction as follows: Page 2, first column, line 29, before the word "suitable" insert --a--; page 4, first column, line 66, Example 8, for "formaldehyde (approx. $28NH_3$)" read --ammonia (approx. 28% $NH_3$)--; and second column, line 21, Example 9, for "phenyl carbamyl" read --phenyl-carbamyl--; page 5, first column, line 22, Example 11, insert the word "Parts" as a heading to the column of figures; line 65, Example 13, for "HCHN" read --HCHO--; and second column, line 32, Example 14, before "0.46 N" insert an opening parenthesis; page 6, first column, line 65, for "light-covered" read --light-colored--; and second column, line 72, for "carbonol" read --carbinol--; page 7, first column, line 15, for "dimenthylol" read --dimethylol--; page 8, first column, line 64, for "acylates" read --acylated--; and second column, line 17, after "pressure" insert a period; page 9, first column, line 5, claim 9, and second column, line 26, claim 19, for "chloracetyl" read --chloroacetyl--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.